United States Patent [19]

Shi

[11] Patent Number: 5,654,859

[45] Date of Patent: Aug. 5, 1997

[54] FAULT TOLERANT POWER DISTRIBUTION SYSTEM

[75] Inventor: Fong Shi, Bellevue, Wash.

[73] Assignee: The Boeing Company, Seattle, Wash.

[21] Appl. No.: 555,700

[22] Filed: Nov. 14, 1995

[51] Int. Cl.[6] .................................................. H02H 3/00
[52] U.S. Cl. .................... 361/66; 361/62; 361/93; 361/100
[58] Field of Search .......................... 361/66, 62, 93, 361/96, 98, 100, 115

[56] References Cited

U.S. PATENT DOCUMENTS

| | | | |
|---|---|---|---|
| 4,952,827 | 8/1990 | Leipold | 307/571 |
| 5,100,821 | 3/1992 | Fay | 437/47 |

*Primary Examiner*—Jeffrey A. Gaffin
*Assistant Examiner*—Stephen Jackson
*Attorney, Agent, or Firm*—Christensen O'Connor Johnson & Kindness, PLLC

[57] ABSTRACT

A power distribution circuit is provided that isolates both power source and load faults. In one embodiment, the power distribution circuit includes two power MOSFETs connected with the channels of the power MOSFETs in series and having their gates electrically connected together. The body diode of one power MOSFET is aligned with the opposite polarity with respect to polarity of the body diode of the second power MOSFET. The power MOSFETs are adapted to be coupled between a first power source and a load. The power distribution circuit also includes a first sensor that detects when the power MOSFETs conduct too much current and switches the power MOSFETs off by discharging the gate voltage of both power MOSFETs during such overcurrent conditions. Accordingly, when both power MOSFETs are switched off, the opposing polarity of the body diodes in the power MOSFETs ensures that one of the body diodes will be reversed biased in case of a short circuit failure in either the load or the power source. Incorporating N such power circuits in a power distribution module for distributing power from N power sources to a single load provides a fault tolerant power distribution module that can tolerate up to N–1 power source faults.

23 Claims, 6 Drawing Sheets

FAULT TOLERANT POWER DISTRIBUTION SYSTEM

FIELD OF THE INVENTION

The present invention relates to electronic circuitry and, more particularly, to the electronic circuitry of power distribution modules used in distributing power from power sources to loads.

BACKGROUND OF THE INVENTION

Large complex systems such as power plants, aircraft, ships, or even automobiles, increasingly rely upon complex electronic systems to operate. These electronic systems are often critical components that must not fail because such failure could result in a severe system failure. In order to avoid catastrophic failure, large complex systems generally include multiple power sources to power the critical electronic systems so that if one power source fails, the other power source can supply the needed power.

The multiple power sources of large complex systems are typically coupled to multiple power distribution modules that distribute power from the multiple power sources to the critical electronic systems. Ideally, the power distribution modules isolate both power source failures and failures in the critical electronic system, or load, because a failure in either a power source or a load may cause failure of the entire power distribution system. For example, if the power distribution system did not isolate the power sources, a short circuit failure in one power source would also short circuit the output of the second power source (sometimes causing this second power source to fail as well), resulting in total power failure to the critical electronic systems coupled to the power sources. Similarly, if the power distribution modules did not isolate the loads, a short circuit failure in one of the loads would short circuit the output of both power sources, again resulting in total power failure. Thus, without both power source and load isolation, a so-called "single-point failure" is possible. Of course, single-point failures are not acceptable for critical electronic systems.

FIG. 1 shows a conventional power distribution system 100 with "ORing" diodes that is susceptible to single-point failures. Power distribution system 100 includes a power source 102 having an output terminal 104 coupled to a load 106 through a diode 108. The output lead 109 of diode 108 is also connected to a load 110. Power distribution system 100 also includes a second power source 112 having an output terminal 114 coupled to load 110 through a diode 116. The output lead 117 of diode 116 is also connected to load 106. Diodes 108 and 116 are referred to as "ORing" diodes because they operate in a logical OR manner to provide power from either power source 102 or power source 112 to both loads 106 and 110. Thus, for example, if power source 102 fails, power source 112 will supply power to load 106 through ORing diode 116. Similarly, if power source 112 fails, power source 102 will supply power to load 110 through ORing diode 108.

However, if, for example, load 106 were to have a short circuit failure, failed load 106 will short circuit the output terminal 104 of power source 102, thus drawing substantially all of the power supplied by power source 102. In addition, failed load 106 will short circuit output terminal 114 via diode 116, thereby drawing substantially all of the power supplied by power source 112 to failed load 106, resulting in a single-point failure of power distribution system 100.

A further problem with power distribution system 100 is that the ORing diodes dissipate a substantial amount of power. In order to avoid diode destruction, heat sinks are generally supplied for the ORing diodes, thereby increasing the size, weight and cost of the power distribution system. In some applications, such as, for example, aircraft, increasing size and weight is extremely undesirable. Moreover, ORing diodes typically cause a voltage drop of approximately 0.5–0.8 volts during normal operation. In low voltage "in-line" systems, the voltage drop at the ORing diodes is extremely undesirable because the voltage drop represents a large percentage of the power source's output voltage and could significantly degrade the performance of the critical electronic system. For example, many electronic systems now operate with 3.3 volt power. Thus, the voltage drop in the ORing diodes could cause the voltage at the electronic systems to drop below the electronic systems' minimum required voltage, thereby prevent the electronic system from operating.

FIG. 2 shows a block diagram of a conventional power distribution system 200 that replaces ORing diodes 108 and 116 of power distribution system 100 with solid state power controllers (hereinafter "SSPCs") 202, 204, 206 and 208. Like reference numbers are used herein to designate elements with substantially identical structure and function. Power source 102 is coupled to loads 106 and 110 through SSPCs 202 and 208, respectively. Similarly, Power source 112 is coupled to loads 106 and 110 through SSPCs 204 and 206, respectively.

SSPCs 202, 204, 206 and 208 can be any commercially available SSPC, such as, for example, model SSP-21110 available from ILC Data Device Corporation, Bohemia, N.Y. Each SSPC includes a controller, a current sensor and a n-channel power metal-oxide-semiconductor field effect transistor (hereinafter "MOSFET"). The power MOSFETs of power distribution system 200 dissipate significantly less power and drop less voltage compared to the ORing diodes of power distribution system 100 (FIG. 1). The controller switches off the power MOSFET when the sensor detects an output overcurrent condition (indicative of a shorted load failure) to isolate the failed load from the power source. Although SSPCs 202, 204, 206 and 208 provide load fault isolation and lower power dissipation and voltage drop than ORing diodes, four SSPCs are needed to replace two diodes. In addition, an SSPC is a much more complex circuit than a diode. Consequently, power distribution system 200 is significantly more costly than power distribution system 100.

Moreover, power distribution system 200 does not isolate power source failures. The n-channel power MOSFET of each SSPC is coupled so that its source and drain are respectively coupled to the corresponding load and power source. The type of n-channel power MOSFET typically used in a SSPC has an inherent diode (i.e., the so called "body diode") that is coupled between the power MOSFET's source and drain, which is forward biased when the power MOSFET has a positive source-to-drain voltage. The power MOSFET is configured in a typical SSPC so that the power MOSFET's drain and source are coupled to the power source and the load, respectively. In normal operation, the voltages at output terminals 104 and 114 are higher than the voltages at loads 106 and 110, thereby causing the body diodes in the SSPCs to be reverse-biased. Accordingly, when the controller switches off the power MOSFETs, no current can flow from power sources 102 and 112 to loads 106 and 110. However, if, for example, the voltage at output terminal 104 of power source 102 is lower than the voltage at loads 106 and 110 (e.g., when power source 102 experiences a short circuit failure), the body diode in SSPC 202 allows current to be rerouted from load 106 and power source 112 to failed power source 102. Similarly, the body diode in SSPC 208 allows current to be rerouted from power source 112 and load 110 to failed power source 102. Thus, power distribution system 200 is susceptible to a single-point failure because power distribution system 200 does not isolate power source failures.

FIG. 3 shows a schematic diagram of conventional power cross-strapping power distribution system 300 used in some commercial aircraft systems. Power distribution system 300 includes a cross-strapping circuit 301 controlled by an external control unit (not shown). Cross-strapping circuit 301, in normal operation, provides a current path between power source 102 and load 106 via SSPC 202. In addition, cross-strapping circuit 301 provides a current path between power source 112 and load 110 via SSPC 206. Thus, each load has a corresponding power source, and each power source is isolated from the other power source. In addition, SSPCs 202 and 206 are each in a single-load configuration that provides load failure isolation through the body diode of its power MOSFET. The external control unit detects the status of power sources 102 and 112 and provides control signals to cross-strapping circuit 301.

Cross-strapping circuit 301 includes normally-closed relay 302 between power source 102 and SSPC 202 at a node 305. As a result, power flows from power source 102 to load 106 through node 305 and SSPC 202. Similarly, cross-strapping circuit 301 includes normally-closed relay 308 connected between power source 112 and SSPC 206 at a node 311, thereby allowing power to flow from power source 112 to load 110 through node 311 and SSPC 206. A normally-open relay 312 is connected between nodes 305 and 311.

Power distribution system 300 operates as follows. If, for example, power source 102 were to fall, the external control unit, detecting the failed status of power source 102, would cause relay 302 to open, thereby providing "downstream" isolation from failed power source 102. In a break-before-make manner, the external control unit then causes normally-open relay 312 to close, thereby providing a current path between functional power source 112 and load 106, via relays 308 and 312 and SSPC 202. Conversely, if power source 112 were to fail, the external control unit would cause relay 308 to open and relay 3 12 to close in a break-before-make manner to provide a current path between power source 102 and load 110 via SSPC 206 and relays 312 and 302.

Although power distribution system 300 provides bi-directional fault isolation, the relays and external monitoring and control are relatively slow. Consequently, power interruptions of 20 to 60 ms typically occur, which is undesirable. Therefore, backup batteries are often included in the system, which, of course, add complexity, size, weight and cost to the system. In addition, the external control unit must monitor the power sources and control relay 312, adding complexity to the external control unit.

SUMMARY OF THE INVENTION

According to the present invention, a power distribution circuit is provided that isolates both power source and load faults. In one embodiment of the present invention, the power distribution circuit includes two power MOSFETs connected with the channels of the power MOSFETs in series and having their gates electrically connected together. The body diode of one power MOSFET is aligned with opposing polarity with respect to polarity of the body diode of the second power MOSFET in a "back-to-back" (i.e., the MOSFETs' sources are coupled together) or "front-to-front" (i.e., the MOSFETs' drains are coupled together) configuration. These back-to-back (or front-to-front) power MOSFETs are adapted to be coupled between a first power source and a load. The power distribution circuit also includes a first sensor that detects when the power MOSFETs conduct too much current (e.g., when a short circuit failure occurs in the load) and switches the power MOSFETs off by discharging the gates of both power MOSFETs during such overcurrent conditions.

The sensor also detects whether a current is flowing from the load to the power source (hereinafter "reverse current"). During such a reverse current condition, the sensor causes the gates of both power MOSFETs to be discharged.

Accordingly, when both power MOSFETs are switched off, the back-to-back (or front-to-front) configuration ensures that one of the body diodes will be reversed biased in case of a short circuit failure in either the load or the power source. Thus, a power distribution circuit according to the present invention is capable of bi-directional fault isolation. Further, because power MOSFETs are used instead of ORing diodes, this embodiment achieves power source fault isolation with reduced power dissipation and voltage drop. The low power dissipation of the power MOSFETs allows the power distribution circuit to be more efficient. The low voltage drop of the power MOSFETs makes the power distribution circuit practical for low voltage "in-line" systems, such as 5 and 3.3 volt power distribution systems used for supplying power to computer and other electronic systems.

In another embodiment of the present invention, a second set of back-to-back (or front-to-front) power MOSFETs are adapted to be coupled between the same load and a second power source. This embodiment also includes a second sensor for detecting overcurrent and reverse current conditions in the second set of power MOSFETs and shutting off the second set of power MOSFETs during such overcurrent and reverse current conditions. Thus, this embodiment provides power system fault tolerance. If, for example, the load were to have a short circuit failure, the sensor would cause the first and second sets of power MOSFETs to turn off, thereby isolating the load failure and allowing the power sources to power other loads. Similarly, if the first power source were to have a short circuit failure, the first sensor would detect the short circuit failure and cause the first set of power MOSFETs to turn off. The load would continue to receive power from the second power source though the second set of power MOSFETs. This embodiment performs this power cross-strapping automatically without using relatively slow relays and external control. A hold-up capacitor may be used to protect against transient noise during the autonomous cross-strapping.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
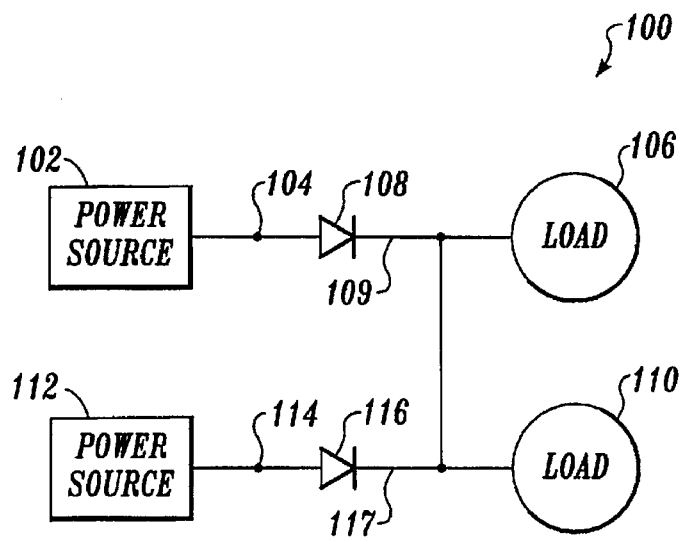
FIG. 1 shows a schematic diagram of a conventional ORing diode power distribution system.
Figure 2:
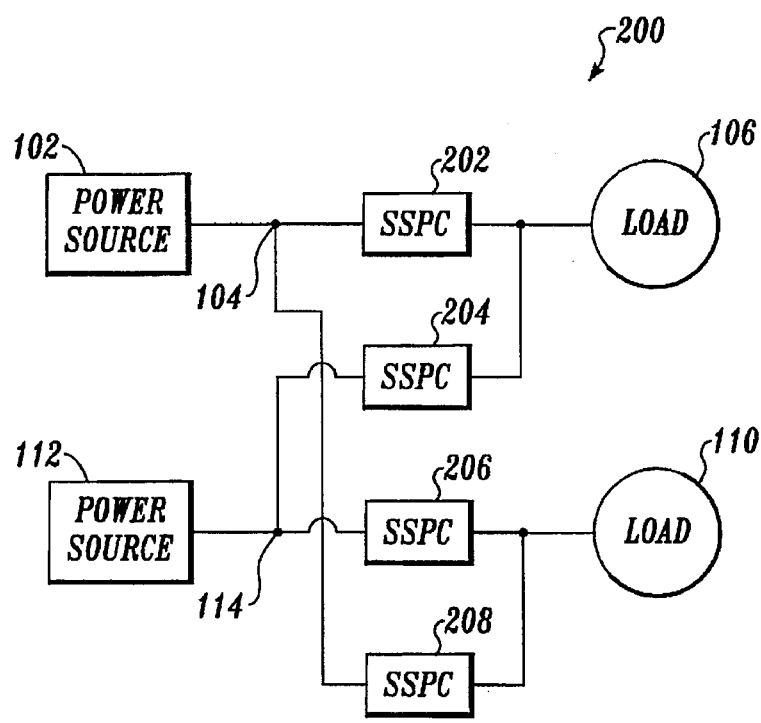
FIG. 2 shows a schematic diagram of a conventional SSPC power distribution system.
Figure 3:
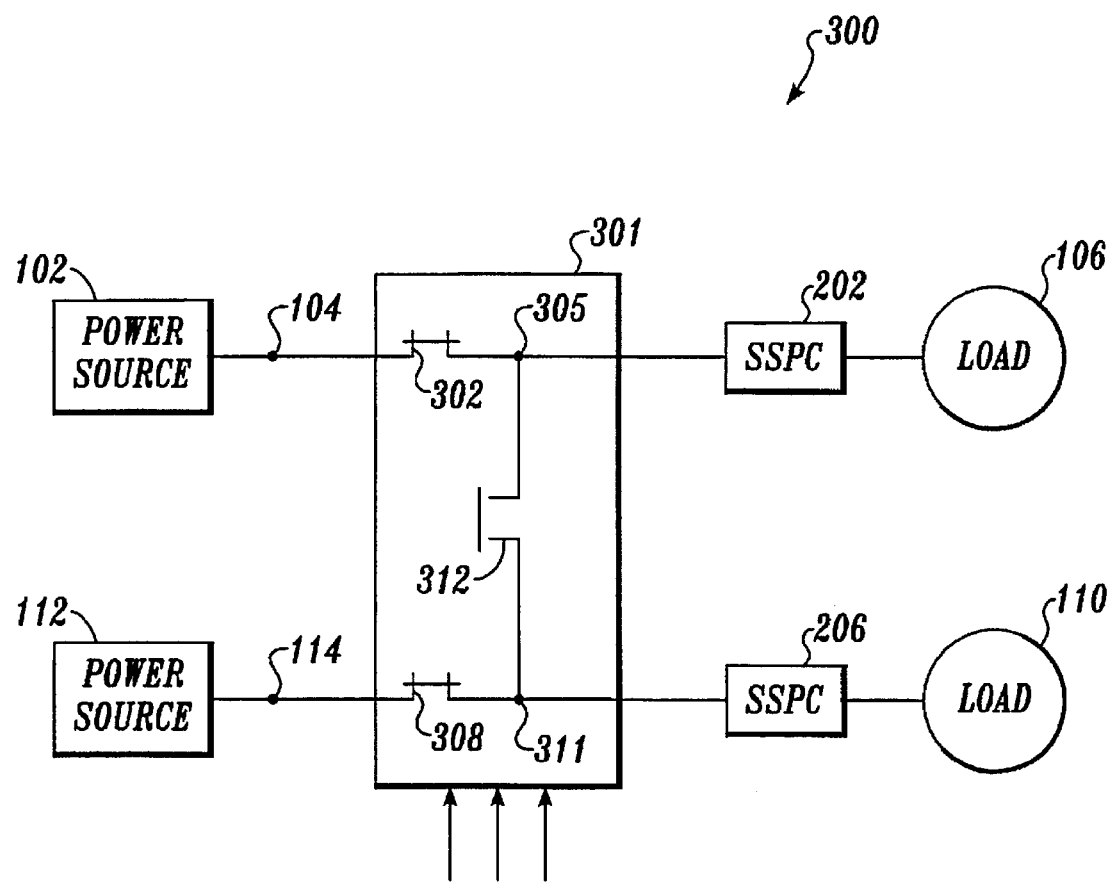
FIG. 3 shows a schematic diagram of a conventional SSPC cross-strapping power distribution system.
Figure 4:
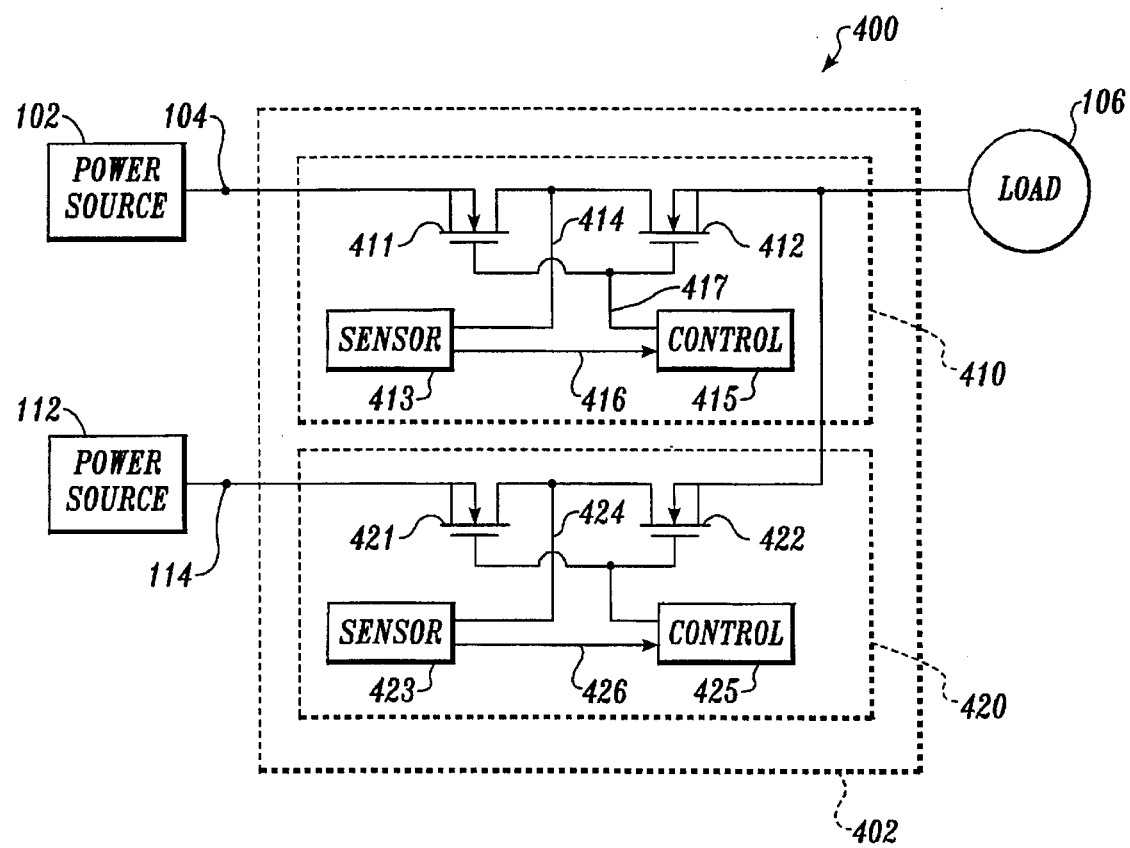
FIG. 4 shows a simplified block diagram of a fault tolerant power distribution system according to one embodiment of the present invention.

FIG. 4 shows a block diagram of a power distribution system 400 including a power distribution module 402 according to one embodiment of the present invention. Power distribution module 402 is connected between load 106 and output terminal 104 of power source 102. Power distribution module 402 includes a power distribution circuit 410 with series-connected power MOSFETs 411 and 412. Power MOSFETs 411 and 412 can be any type of power MOSFET, such as, for example, model SMP60N03 available from Siliconix Inc., Santa Clara, Calif., the data sheet of which is incorporated herein by reference. In this embodiment, first power MOSFET 411 having its source connected to output terminal 104 and its drain connected to the drain of second power MOSFET 412. The source of second power MOSFET 412 is connected to load 106. Thus, the body diodes of power MOSFETs 411 and 412 are connected with opposing polarity in a front-to-front configuration. Accordingly, when turned off, power MOSFETs 411 and 412 prevent current from flowing in either direction between power source 102 and load 106 (i.e., bi-directional isolation).

A sensor 413 is connected to the drains of power MOSFETs 411 and 412 through a lead 414, whereby sensor 413 detects when the current conducted by power MOSFETs 411 and 412 exceeds a predetermined limit. The predetermined limit is set according to the safe operating area provided in the data sheet for the devices used for power MOSFETs 411 and 412. When power MOSFETs 411 and 412 conduct a current greater than the predetermined limit, a so called "overcurrent" condition has occurred. Such an overcurrent condition can occur when load 106 experiences a short circuit fault. Upon detecting an overcurrent condition, sensor 413 transmits an overcurrent signal to control circuit 415 via a lead 416 connecting control circuit 415 and sensor 413. The overcurrent signal causes control circuit 415 to turn off power MOSFETs 411 and 412 as described below.

Sensor 413 also detects whether a "reverse" current from load 106 to power source 102 flows through power MOSFETs 411 and 412. Upon detecting a reverse current, sensor 413, coupled to power MOSFETs 411 and 412, causes power MOSFETs 411 and 412 to turn off.

Control circuit 415 is connected to the gates of power MOSFETs 411 and 412 through a lead 417. In response to the overcurrent signal from sensor 413, control circuit 415 discharges the gate voltage of power MOSFETs 411 and 412, thereby turning off power MOSFETs 411 and 412.

Unlike conventional SSPC modules, the front-to-front body diodes of power distribution circuit 410 bi-directionally isolate power source 102 and load 106.

Accordingly, a short circuit failure of load 106 does not cause a fault in power source 102, thereby allowing power source 102 to continue supplying power to other loads that may be coupled to power source 102. Similarly, a short circuit failure in power source 102 does not cause a failure in any other power source that may be coupled to load 106, thereby allowing load 106 to continue to receive power from such other power source.

Further, because power distribution module 402 uses power MOSFETs instead of ORing diodes as in some conventional systems, power distribution module 410 has a substantially reduced power dissipation, thereby increasing efficiency. In addition, no heat sinks are needed, thereby reducing size, weight and cost. Moreover, power MOSFETs 411 and 412 have a reduced voltage drop relative to ORing diodes. The low voltage drop of the power MOSFETs makes power distribution module 410 practical for low voltage "in-line" systems, such as the 5 and 3.3 volt power distribution systems used for supplying power to computer and other electronic systems.

In this embodiment, power distribution module 402 also includes a second power distribution circuit 420. Power distribution circuit 420 is substantially identical in structure and operation to power distribution circuit 410, except that power distribution circuit 420 is connected between load 106 and output terminal 114 of power source 112. Thus, power distribution module 420 includes front-to-front coupled power MOSFETs 421 and 422, sensor 423 and control circuit 425, which are substantially identical in structure and interconnection to power MOSFETs 411 and 412, sensor 413 and control circuit 415. Power distribution circuit 420 serves to bi-directionally isolate power source 112 from load 106.

Power distribution module 402 together with power sources 102 and 112 provide a dual redundant power source system for load 106. For example, power source 112 is capable of providing power to load 106 in the event that power source 102 fails. Because power distribution circuits 410 and 420 bi-directionally isolate faults between load 106 and their corresponding power source, power distribution module 402 eliminates single-point failures caused by load or power source faults. In addition, unlike some conventional systems, power distribution module 402 provides power cross-strapping with neither an external cross-strapping circuit, nor external monitoring and control circuitry. Thus, power distribution module 402 provides power cross-strapping automatically and reduces the size, weight and cost of the power distribution system, compared to many conventional systems. Further, in one embodiment, sensor 413 and control circuit 415 require only several μs (compared to the 20 to 60 ms required in some conventional systems) to sense a failed power source and discharge the gates of power MOSFETs 411 and 412 to isolate failed power source 102. As a result, the large battery backup (typically required by these conventional systems to provide power and compensate for transient noise during cross-strapping) can be made much smaller or even eliminated by replacement using a hold-up capacitor, thereby decreasing the size, weight and cost of the power distribution system.

Although this embodiment of power distribution module 402 includes two power distribution circuits, other embodiments of power distribution module 402 include additional power distribution circuits corresponding to the number of power sources available. Consequently, in a triple redundant power source system, power distribution module 402 would include three power distribution circuits, each respectively connecting the load to a corresponding power source. Thus, for use in a system with N (N being an integer greater than 1) power sources, a N redundant power distribution module has N power distribution circuits and can tolerate N−1 power source faults.

Figure 5:
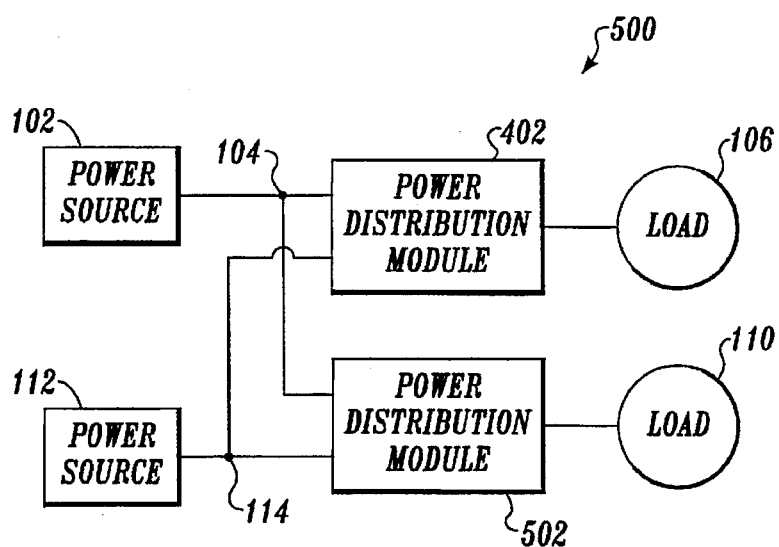
FIG. 5 shows a block diagram of a power distribution system with two loads, two power sources and two power distribution modules.

FIG. 5 shows a block diagram of a dual-load power distribution system 500 with two power distribution modules coupling power sources 102 and 112 to loads 106 and 110. Power distribution module 402 couples power sources 102 and 112 to load 106 as described above in conjunction with FIG. 4. Power distribution system 500 also includes a power distribution module 502 that is substantially identical to power distribution module 402, except power distribution module 502 couples power sources 102 and 112 to load 110 rather than load 106. As such, power distribution module 502 operates in a substantially identical manner as power distribution module 402 to bi-directionally isolate short circuit faults in load 110 and power sources 102 and 112. For example, if load 110 were to experience a short circuit failure, power distribution module 502 would operate to isolate failed load 110 from power sources 102 and 112 in a substantially similar manner as power distribution module 402 (described above in conjunction with FIG. 4). Consequently, power sources 102 and 112 continue to supply power to load 106 via power distribution module 402. Further, power distribution module 502 would operate in substantially the same manner as power distribution module 402 (described in conjunction with FIG. 4) to automatically isolate a short circuit failure in power source 102 from load 110 and allow power from power source 112 to continue to provide power to load 110. Thus, power distribution modules 402 and 502 eliminate single-point failures in power distribution system 500 while reducing power dissipation, voltage drop and cross-strapping time.

Figure 6:
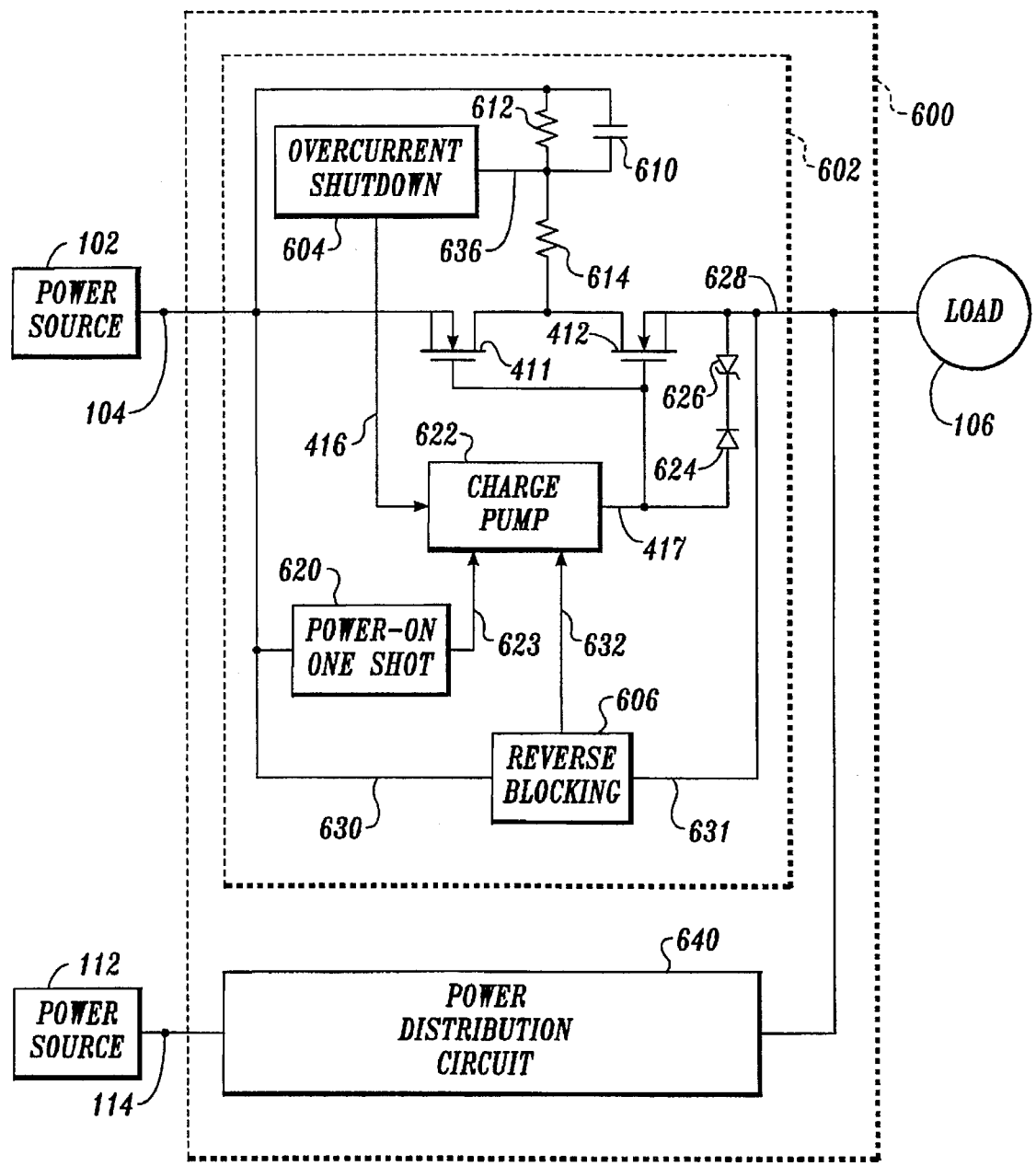
FIG. 6 shows a block diagram of a power distribution module according to another embodiment of the present invention.

FIG. 6 shows a block diagram of a power distribution module 600 according to another embodiment of the present invention. Power distribution module 600 is similar to power distribution module 402 (FIG. 4), except that the sensor and control circuits of power distribution circuit 402 are implemented with multiple circuits in each power distribution circuit of power distribution module 600. For example, a power distribution circuit 602 in power distribution module 600 includes an overcurrent shutdown circuit 604, a reverse blocking circuit 606, a capacitor 610 and resistors 612 and 614, which together implement the functions of sensor 413 in power distribution circuit 410 (FIG. 4). Similarly, a power-on one shot circuit 620, a charge pump 622, a diode 624 and a zener diode 626 in power distribution circuit 602 together implement the functions control circuit 415 (FIG. 4) in power distribution circuit 410.

Overcurrent shutdown circuit 604 senses the current conducted by power MOSFETs 411 and 412 and compares the magnitude of this current to a predetermined limit. This limit is set to a value within the safe operating area of the devices implementing power MOSFETs 411 and 412. If the current conducted by power MOSFETs 411 and 412 exceeds the predetermined limit, overcurrent shutdown circuit 604 transmits a shutdown signal to charge pump 622 via line 416.

Charge pump 622, connected to the gates of power MOSFETs 411 and 412 through line 417, operates to charge or discharge the gates of power MOSFETs 411 and 412. Charge pump 622 can be any conventional charge pump suitable for the voltages being distributed by power distribution module 600. Because power MOSFETs 411 and 412 are n-channel devices, charging their gates causes power MOSFETs 411 and 412 to turn on, whereas discharging their gates causes power MOSFETs 411 and 412 to turn off. Diode 624 is coupled between an output lead 625 of power distribution circuit 602 (i.e., coupled to the source of power MOSFET 412) and the gates of power MOSFETs 411 and 412, through zener diode 626 in a cathode-to-cathode (front-to-front) configuration. Thus, as charge pump 622 turns on power MOSFETs 411 and 412, the gate voltage rises above the output voltage at output lead 628, thereby causing diode 624 to become forward biased and zener diode 626 to become reverse biased. Zener diode 626 serves as a clamp to maintain the gate voltage to approximately a breakdown voltage of zener diode 626 above the output voltage at output lead 628, thereby protecting power MOSFETs 411 and 412 from the gate-source breakdown. Diode 624 prevents current from output lead 628 (provided by power source 112) from turning on power MOSFETs 411 and 412 when reverse blocking circuit 606 (described further below) has turned off power MOSFETs 411 and 412 due to failure of power source 102.

Charge pump 622 also receives a power-on signal from power-on one shot circuit 620, through a line 623. Power-on one shot circuit 620 is coupled to output terminal 104 of power source 102 and can be any conventional one-shot circuit that outputs a "noise-free" pulse signal in response to a power-on signal received from a control unit (not shown). Thus, power-on one shot 620 provides a pulse to turn on charge pump 622 upon module power-on. Although a one-shot circuit is described in this embodiment, other embodiments may use other noise resistant circuits instead, such as, for example, a Schmitt trigger.

Reverse blocking circuit 606 has input leads 630 and 631 coupled to output terminal 104 of power source 102 and output lead 628, respectively, whereby reverse blocking circuit detects whether the voltage at output terminal 104 is lower than the voltage at output lead 628. Such a voltage condition causes reverse current through power MOSFETs 411 and 412 (indicative of a short circuit fault in power source 102). Reverse blocking circuit 606 has an output lead 632 connected to charge pump 622, through which reverse blocking circuit 606 causes power MOSFETs 411 and 412 to turn off when reverse blocking circuit 606 detects that the voltage at output terminal 104 is lower than the voltage at output lead 628.

Overcurrent shutdown circuit 604 has an input lead 636 coupled to the drains of power MOSFETs 411 and 412 through resistor 614. Capacitor 610 and resistor 612 each have a lead connected to input lead 636 and another lead coupled to output terminal 104 of power source 102. Generally, for a known gate voltage, the current conducted by a power MOSFET can be determined from the source-to-drain voltage. Resistors 612 and 614 form a voltage divider through which overcurrent shutdown circuit 604 monitors the source-to-drain voltage of power MOSFET 411. Thus, when the monitored source-to-drain voltage exceeds the value corresponding to the current limit for power MOSFETs 411 and 412, overcurrent shutdown circuit 604 transmits an overcurrent signal to charge pump 622 via line 416. Responsive to the overcurrent signal, charge pump 622 shuts down power MOSFETs 411 and 412 by discharging their gates. Resistor 612 and capacitor 610 help compensate for transient fluctuations in the current conducted by power MOSFETs 411 and 412. As a result, transient overcurrent condition will not cause overcurrent shutdown circuit 604 to turn off power MOSFETs 411 and 412.

Power distribution module 600 includes a second power distribution circuit 640 substantially identical to power distribution circuit 602 in structure and interconnection, except that power distribution circuit 640 is coupled to power source 112 rather than power source 102.

In operation, power distribution module 600 provides substantially the same function as power distribution module 402 (FIG. 4). When turned off, the front-to-front configuration of the power diodes in each of the power distribution circuits 602 and 640 provide bi-directional isolation of short circuit faults. In each power distribution circuit, the overcurrent shutdown circuit detects overcurrent conditions (indicative of a short circuit fault in its corresponding load) and signals the charge pump to turn off the power MOSFETs. Similarly, the reverse blocking circuit of each power distribution circuit detects when the output lead voltage is higher than the voltage received from its corresponding power source (indicative of a short circuit fault in the power source) and signals the charge pump to turn off the corresponding power MOSFETs.

Figure 7:
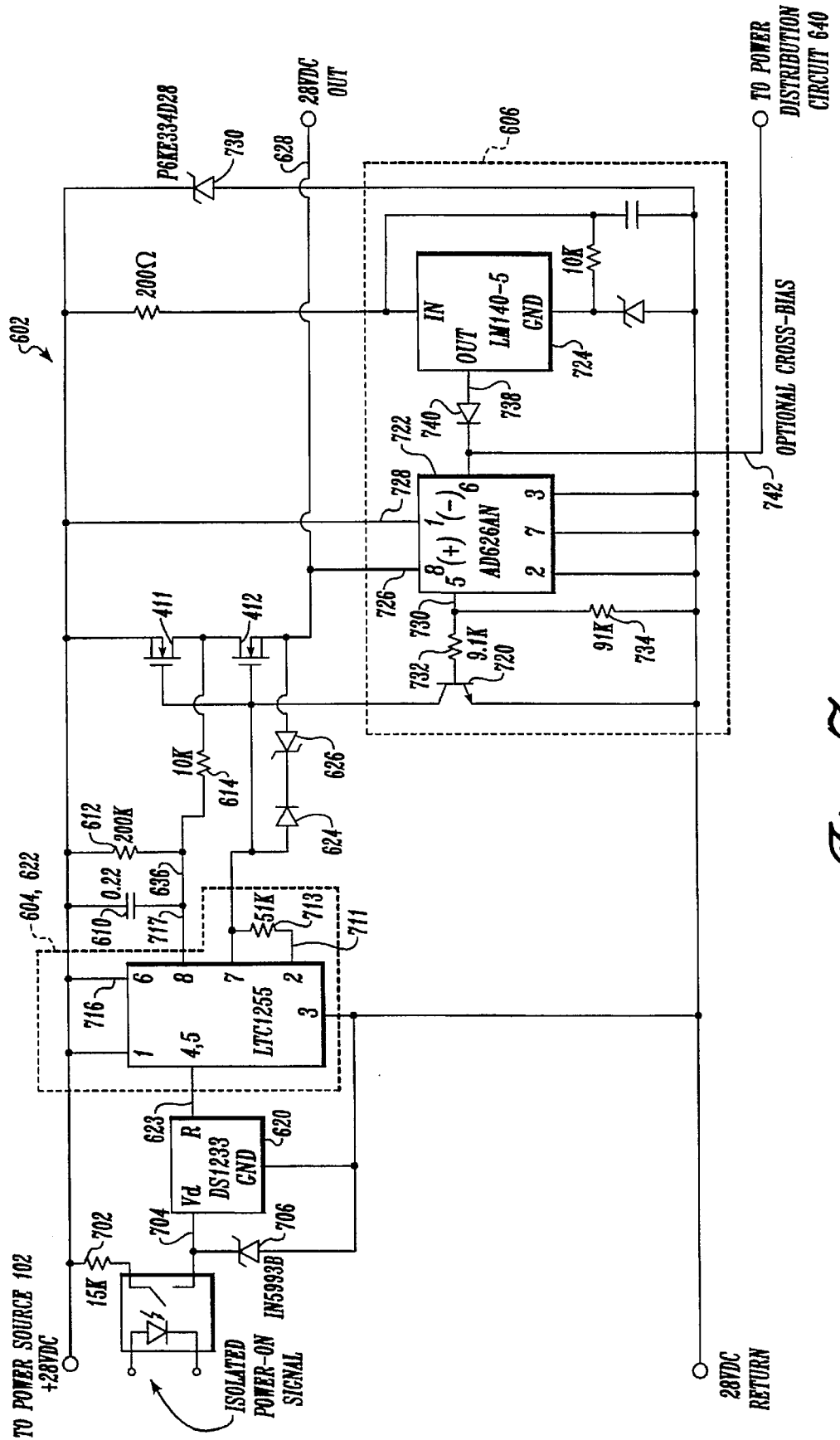
FIG. 7 shows a schematic diagram of the fault tolerant power distribution circuit depicted in FIG. 6.

FIG. 7 shows a schematic diagram of one embodiment of power distribution circuit 602 (FIG. 6) for a 28 volt power distribution module. In this embodiment, power-on one shot 620 is a model DS1233 available from Dallas Semiconductor, Dallas, Tex., the data sheet of which is incorporated herein by reference. Power-on one shot 620 is coupled to the 28 volt line through a 15 KΩ resistor 702 at a Vd input lead 704. Vd input lead 704 is also connected to the cathode of a zener diode 706, which has its anode connected to the 28 volt return line. Resistor 702 and zener diode 706 operate to provide approximately 5 volts at Vd input lead 704 to power power-on one shot 620.

Charge pump 622 and overcurrent shutdown circuit 604 are implemented using a model LTC1255 dual charge pump, available from Linear Technology Corp., Milpitis, Calif., the data sheet of which is incorporated herein by reference. Both charge pump outputs at leads 710 and 711 are used to charge the gates of power MOSFETs 411 and 412, via line 417, so that the LTC1255 more quickly charges the gates of power MOSFETs 411 and 412. Zener diode 626 is a standard 1N5242B zener diode, having a breakdown voltage of approximately 12 volts. Thus, the clamp formed by diode 624 and zener diode 626 clamps the voltage at the gates of power MOSFETs 412 and 412 to approximately 40 volts above the 28 volt return line.

A 51 KΩ resistor 713 is coupled between output leads 710 and 711 to isolate the charge pump output voltages so that the dual charge pumps of the LTC1255 can be disabled properly. The LTC1255 includes a 100 mv comparator at pins 6 and 8, which are respectively coupled to the 28 volt power line and the drain of power MOSFET 411 via leads 716 and 717. As stated above, in this embodiment, power MOSFET 411 is a model SMP60N03 power MOSFET, which has an "on" resistance of approximately 7 to 10 mΩ to with a source voltage of 28 volts and a gate voltage of 40 volts. Thus, any current through power MOSFET 411 over approximately 10 amps will cause the comparator in the LTC1255 to indicate an overcurrent condition, which in turn disables the dual charge pumps in the LTC1255.

Reverse blocking circuit 606 is implemented using a switch 720, an amplifier 722 and a reference 724. In this embodiment, switch 720 is implemented using a standard 2N2222 npn transistor. The emitter of switch 720 is connected to the 28 volt return line, and the collector to lead 714 of the charge pumps. Of course, switch 720 may be implemented using any suitable switch, such as, for example, FET switches or pnp transistor circuits. When turned on, switch 720 operates to discharge the gates of power MOSFETs 411 and 412.

Amplifier 722 is implemented with a model AD626AN differential amplifier available having a large common mode from Analog Devices, Norwood, Mass., the data sheet of which is incorporated herein by reference. Of course, any suitable amplifier or comparator may be used in other embodiments. Amplifier 722 has an plus input lead 726 coupled to output lead 628, a minus input lead 728 connected to the 28 volt power line, and an output lead 730 coupled to the base of switch 720 through a resistor 732. When the voltage at output lead 628 is higher than the voltage at the 28 volt power line, amplifier 722 provides a base current to switch 720 through output lead 730 and resistor 732. A resistor 734, coupled between output lead 730 and the 28 volt return line, serves to shunt approximately one tenth of the current supplied by amplifier 730. The base current provided by amplifier 722 causes switch 720 to turn on. As a result, switch 720 conducts a current to the 28 volt return line, thereby discharging the gates of power MOSFETs 411 and 412.

Reference 724 provides power to amplifier 722 through an output lead 738 and a diode 740. Reference 724 is implemented with a model LM140-5 reference available from National Semiconductor, the data sheet of which is incorporated herein by reference. Reference 724 is configured to receive 28 volt power from the 28 volt power line and output approximately 10 to 11 volt power to amplifier 722.

In addition, a zener diode 730 is connected between the 28 volt power line and the 28 volt return line. Zener diode 730 is implemented with a model P6KE334D28 available from Motorola, and serves to clamp the voltage at the 28 volt power line to approximately 30 volts above the 28 volt return line, thereby providing line transient protection for the LTC1255. Thus, Zener diode 730 makes more practical the use of the LTC1255, which can be damaged by supply voltages over 30 volts.

Reverse blocking circuit 606 has an optional cross-bias line 742, which is connected to the cathode of diode 740. Cross-bias line 742 is connected to the cathode of the corresponding diode of reverse blocking circuit of power distribution circuit 640. Thus, reverse blocking circuit will continue to receive power even if reference 724 were to stop providing power.

Figure 8:
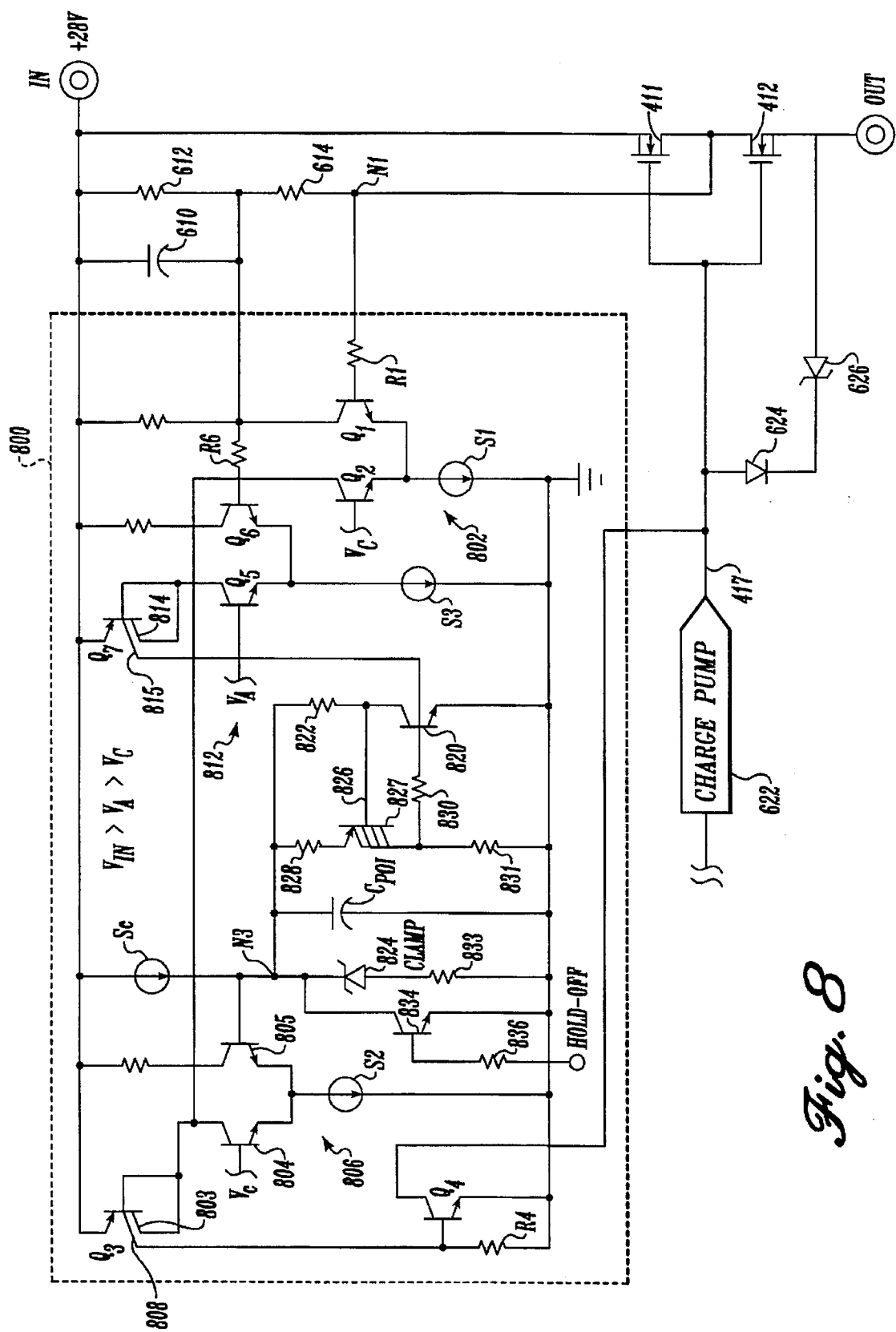
FIG. 8 shows a schematic diagram of one embodiment of a current-limit/over-current shutdown circuit.

FIG. 8 shows a schematic diagram of a current-limit/overcurrent shutdown circuit 800 according to one embodiment of the present invention. Current-limit/overcurrent shutdown circuit 800 can replace overcurrent shutdown circuit 604 (FIG. 6) in power distribution circuit 602 and is suitable for implementation in an integrated circuit. Current-limit/overcurrent shutdown circuit 800 includes a emitter-coupled pair 802 formed by npn transistors Q1 and Q2 and current source S1. The base of transistor Q1 is coupled to the channel of power MOSFET 411 through a resistor R1 Specifically, resistor R1 is coupled to the drains of power MOSFETs 411 and 412 at one end through a node N1.

Current-limit/overcurrent shutdown circuit 800 provides a current limiting function as follows. As power MOSFET 411 enters an overcurrent condition, the voltage at node N1 drops, thereby causing transistor Q1 to conduct less current. Further, the base of transistor Q2 is connected to a voltage source Vc providing a substantially constant voltage to the base of transistor Q2. Consequently, as transistor Q1 conducts less current due to the overcurrent condition, current source S1 causes transistor Q2 to conduct more current.

The collector of transistor Q2 is connected to the base and a collector 803 of a dual collector pnp transistor (or current mirror) Q3. A collector 808 of current mirror Q3 is connected to the base of a npn transistor Q4. In non-overcurrent conditions, transistor Q4 is off. The emitter of transistor Q3 is connected to the 28 volt power line. In addition, the collector of transistor Q2 is connected to the collector of a npn transistor 804. Transistor 804, together with npn transistor 805 and a current source S2, form an emitter-coupled pair 806. At the start of the overcurrent condition in power MOSFET 411, the base current of transistor 805 remains approximately unchanged (the base current changes after a delay, as described below). As a result, the currents conducted by transistors 804 and 805 remain substantially unchanged also, and the increased current conducted transistor Q2 is supplied from the collector 803 of current mirror Q3. Because the other collector 808 of current mirror Q3 is connected to the base of npn transistor Q4, the base voltage of transistor Q4 is increased, thereby causing transistor Q4 to turn on.

The emitter of transistor Q4 is connected to the 28 volt return line and to its base through a resistor R4. The collector of transistor Q4 is connected to the gates of power MOSFETs 411 and 412. In non-overcurrent conditions, the current provided by collector 808 is near zero, which is not large enough to bias transistor Q4 through resistor R4 to turn transistor Q4 on. However, as the current conducted by collector 808 of current mirror Q3 increases due to an overcurrent condition, transistor Q4 turns on, thereby causing transistor Q4 to conduct a collector current, which operates to begin discharging the gates of power MOSFETs 411 and 412. As a result, power MOSFETs 411 and 412 become less conductive, thereby reducing the amount of current conducted.

Of course, if during this process, the overcurrent condition were to terminate (e.g., after a load transient condition), the reverse of the above process would occur. As power MOSFET 411 conducts less current, the voltage at node N1 (and, thus, the base of transistor Q1) would increase, thereby increasing the emitter current of transistor Q1. Therefore, transistor Q2 would have a decreased collector current, which causes current mirror Q3 to turn off. Consequently, the current through collector 808 decreases, decreasing the base current to transistor Q4, thereby mining off transistor Q4. As a result, the collector current from transistor Q4 discharging the gates of power MOSFETs 411 and 412 decreases, allowing power MOSFETs 411 and 412 to become more conductive.

Current-limit/overcurrent shutdown circuit 800 provides an overcurrent shutdown function as follows. During the period an overcurrent condition is causing transistor Q1 to conduct less current (in the current limiting function described above), the overcurrent condition also causes responses in other circuitry of current-limit/overcurrent shutdown circuit 800 as follows. Current-limit/overcurrent shutdown circuit 800 also includes a third emitter-coupled pair 812 formed by current source S3 and transistors Q5 and Q6. The base of transistor Q5 is connected to a voltage source Va providing a substantially constant voltage to the base of transistor Q5. The voltage provided by voltage source Va is higher than the voltage provided by voltage source Vc, but lower than 28 volts. The base of transistor Q6 is coupled to the drain of power MOSFET 411 (i.e., node N1) through resistor 614 and a resistor R6. Thus, as an overcurrent condition causes the voltage at node N1 to decrease, the voltage at the base of transistor Q6 also decreases. However, capacitors 610 and 614 and resistor 612, coupled between resistor R6 and the 28 volt power line, serve as an RC delay circuit, delaying the decrease in voltage at the base of transistor Q6.

Consequently, emitter current conducted by transistor Q6 decreases, thereby causing the emitter current of transistor Q5 to increase. The collector of transistor Q5 is connected to the base and a collector 814 of a dual-collector pnp current mirror Q7. Thus, as the emitter current of transistor Q5 increases, the base current of current mirror Q7 increases, thereby causing an increase in the collector currents of current mirror Q7.

The other collector 815 of current mirror Q7 is connected to the base of a npn transistor 820. Consequently, the increased current of collector 815 increases the base current of transistor 820, causing transistor 820 to have an increased collector current. The collector of transistor 820 is coupled to a base 826 of a multi-collector pnp transistor 827. The collector of transistor 820 is also coupled to a node N3 through a resistor 822. In addition, the emitter of transistor 827 is coupled to node N3 through a resistor 828. Thus, as the collector current of transistor 820 increases, the voltage drop across resistor 822 increases, thereby increasing the emitter-to-base voltage of transistor 827.

In addition, node N3 is also coupled to the cathode of a zener diode 824 and the base of transistor 805 of emitter-coupled pair 806. During non-overcurrent conditions, zener diode 824 clamps the voltage at node N3, which is charged by a current source Sc, to approximately a volt greater than voltage Vc. A capacitor Cpoi coupled between node N3 and the 28 volt return line serves as a hold-up capacitor to help maintain the voltage at node N3 to at the breakdown voltage of zener diode 824. Consequently, transistor 804 of emitter-coupled pair 806 is off during non-overcurrent conditions.

As described above an overcurrent condition causes transistor 820 to have an increased collector current (after the delay introduced by capacitor 610 and resistors 612 and 620), which in turn causes the emitter-to-base voltage of transistor 827 to increase. This increase in the emitter-to-base voltage causes transistor 827 to turn on. After transistor 827 turns on, the multiple collectors of transistor 827, coupled to the base of transistor 820 through a resistor 830, provide additional base current to transistor 820, thereby latching transistors 820 and 827 on. A resistor 831, coupled between the 28 volt return line and the collectors of transistor 826, conducts some of the collector current from transistor 827 to the 28 volt return line to properly bias transistor 820. Thus, once transistor 827 has turned on, transistors 820 and 827 remain on even when current mirror Q7 stops providing current to the base of transistor 820.

The combined current conducted by transistors 820 and 827 is sufficient to discharge capacitor Cpoi, thereby reducing the voltage at node N3. As a result, in emitter-coupled pair 806, transistor 805 turns off and transistor 804 turns on hard. Because the collector of transistor 804 is connected to the base of current mirror Q3, current mirror Q3 greatly increases the current conducted by collector 808. Consequently, transistor Q4 quickly discharges the gates of power MOSFETs 411 and 412. In addition, as the voltage at node N3 decreases, transistor 827 will turn thereby releasing the latch. Current source Sc then charges capacitor Cpoi and, thus, the overcurrent shutdown process repeats itself as long as an overcurrent condition remains.

An optional npn transistor 834 has a base coupled to receive a hold-off signal from an external control unit (not shown) through a resistor 836. The collector of transistor 834 is connected to the base of transistor 805, whereas the emitter of transistor 834 is connected to the 28 volt return line. The external control unit transmits the hold-off signal to keep power MOSFETs 411 and 412 off. In operation, the hold-off signal turns on transistor 834. As a result, the collector current of transistor 834 discharges node N3, which in turn, as described above, turns on transistor Q4 and discharges the gates of power MOSFETs 411 and 412.

While the preferred embodiment of the invention has been illustrated and described, it will be appreciated that various changes can be made therein without departing from the spirit and scope of the invention. For example, the described embodiments can be easily modified for different voltage and current systems. Also, some embodiments can have the power MOSFETs connected in a back-to-back configuration instead of a front-to-front configuration. Other embodiments can have the reverse blocking circuit implemented with any type sensor that can sense the common-mode line-to-load voltage. Still other embodiments may implement the sensor using other current sensing circuits than those described, such as, for example, transformers, Hall-effect devices or series resistors. In addition, in other embodiments, the control circuit can be implemented with any type of charge pump, such as, for example, switched capacitor types, isolation transformer types or coupled optical pump types.

The embodiments of the invention in which an exclusive property or privilege is claimed are defined as follows:

1. A circuit for distributing power from a power source to a load, said circuit comprising:

an input terminal;

an output terminal;

a first field effect transistor having a gate, a channel and a body diode;

a second field effect transistor having a gate, a channel and a body diode, said channel of said first field effect transistor and said channel of said second field effect transistor being coupled in series between said input terminal and said output terminal, said body diode of said first field effect transistor being aligned with an opposite polarity to said body diode of said second field effect transistor;

a sensor coupled to said channel of said first field effect transistor, said sensor being capable of detecting an overcurrent condition in said first field effect transistor and a current flowing from said output terminal to said input terminal; and a control circuit coupled to said sensor and said gates of said first and second field effect transistors, said control circuit being capable of discharging said gates of said first and second field effect transistors in response to a control signal outputted by said sensor.

2. The circuit of claim 1 wherein said first field effect transistor and said second field effect transistor each comprise a power metal-oxide-semiconductor field effect transistor.

3. The circuit of claim 1 further comprising:

a second input terminal;

a third field effect transistor having a gate, a channel and a body diode;

a fourth field effect transistor having a gate, a channel and a body diode, said channel of said third field effect transistor and said channel of said fourth field effect transistor being coupled in series between said second input terminal and said output terminal, said body diode of said third field effect transistor being aligned with an opposite polarity to said body diode of said fourth field effect transistor;

a second sensor coupled to said channel of said third field effect transistor, said second sensor being capable of detecting an overcurrent condition in said third field effect transistor and a current flowing from said output terminal to said second input terminal; and a second control circuit coupled to said second sensor and said gates of said third and fourth field effect transistors, said second control circuit being capable of discharging said gates of said third and fourth field effect transistors in response to a control signal outputted by said second sensor.

4. The circuit of claim 1 further comprising a one shot circuit coupled to said control circuit.

5. The circuit of claim 1 wherein said sensor comprises an overcurrent shutdown circuit having an output lead coupled to said control circuit, a first input lead coupled to said input terminal and a second input lead coupled to said channel of said first field effect transistor, said overcurrent shutdown circuit being capable of providing said control signal to said control circuit.

6. The circuit of claim 5 wherein said overcurrent shutdown circuit comprises a current limit circuit coupled to said gates of said first and second field effect transistors, said input terminal and said channel of said first field effect transistor, said current limit circuit being capable of limiting a current conducted by said first and second field effect transistors to below a predetermined level.

7. The circuit of claim 1 wherein said sensor comprises a reverse blocking circuit having an output lead coupled to said control circuit, a first input lead coupled to said input terminal and a second input lead coupled to said output terminal, said reverse blocking circuit being capable of detecting a reverse current through said first and second field effect transistors and discharging said gates of said first and second field effect transistors.

8. The circuit of claim 7 wherein said reverse blocking circuit comprises an amplifier having a first input lead coupled to said input terminal, a second input lead coupled to said output terminal and an output lead coupled to said gates of said first and second field effect transistors.

9. The circuit of claim 8 wherein said reverse blocking circuit further comprises a switch coupled between said output lead of said amplifier and said gates of said first and second field effect transistors, said switch being capable of providing a current path to discharge said gates of said first and second field effect transistors in response to an output signal provided by said amplifier.

10. The circuit of claim 1 wherein said control circuit comprises a charge pump having an output lead coupled to said gates of said first and second field effect transistors.

11. The circuit of claim 10 wherein said control circuit further comprises a clamp coupled to said output lead of said charge pump.

12. The circuit of claim 10 wherein said charge pump is capable of providing charge to said gates of said first and second field effect transistors when said sensor detects a current flowing from said output terminal to said input terminal.

13. The circuit of claim 12 wherein said clamp comprises:

a first diode having an anode coupled to said output lead of said charge pump and having an cathode; and a zener diode having a cathode coupled to said cathode of said first diode and an anode coupled to said output terminal.

14. A circuit comprising:

a plurality of input terminals, each input terminal of said plurality of input terminals being adapted to be coupled to a corresponding power source;

an output terminal adapted to be coupled to a load; and a plurality of subcircuits, each subcircuit of said plurality of subcircuits being coupled to a corresponding input terminal of said plurality of input terminals and to said output terminal, whereby each subcircuit of said plurality of subcircuits couples a corresponding power source to said load, each subcircuit of said plurality of subcircuits comprising:

a first field effect transistor having a gate, a channel and a body diode;

a second field effect transistor having a gate, a channel and a body diode, said channel of said first field effect transistor and said channel of said second field effect transistor being coupled in series between said corresponding input terminal and said output terminal, said body diode of said first field effect transistor being aligned with an opposite polarity to said body diode of said second field effect transistor;

a charge pump coupled to said gates of said first and second field effect transistors, said charge pump being capable of discharging said gates of said first and second field effect transistors;

an overcurrent shutdown circuit having an output lead coupled to said charge pump, a first input lead coupled to said corresponding input terminal and a second input lead coupled to said channel of said first field effect transistor, said overcurrent shutdown circuit being capable of causing said charge pump to discharge said gates of said first and second field effect transistors; and a reverse blocking circuit having an output lead coupled to said charge pump, a first input lead coupled to said corresponding input terminal and a second input lead coupled to said output terminal, said reverse blocking circuit being capable of discharging said gates of said first and second field effect transistors when a voltage at said output terminal is greater than a voltage at said corresponding input terminal.

15. The circuit of claim 14 wherein said first and second field effect transistors of each subcircuit of said plurality of subcircuits each comprise a power metal-oxide-semiconductor field effect transistor.

16. The circuit of claim 14 wherein said charge pump of each subcircuit of said plurality of subcircuits is capable of providing charge to said gates of said first and second field effect transistors when said reverse blocking circuit detects a greater voltage at said output terminal than at said corresponding input terminal.

17. The circuit of claim 14 wherein said charge pump of each subcircuit of said plurality of subcircuits comprises a transistor coupled to said gates of said first and second field effect transistors and to a source of ground potential, said transistor being capable of providing a current path to discharge said gates of said first and second field effect transistors.

18. The circuit recited in claim 14 wherein said overcurrent shutdown circuit of each subcircuit of said plurality of subcircuits comprises a current limit circuit having a first input lead coupled to said corresponding input terminal, a second input lead coupled to said channel of said first field effect transistor, and an output lead coupled to said charge pump, said current limit circuit being capable of limiting the current conducted by said first field effect transistor.

19. The circuit of claim 14 wherein said reverse blocking circuit of each subcircuit of said plurality of subcircuits comprises an amplifier having a first input lead coupled to said corresponding input terminal, a second input lead coupled to said output terminal and an output lead coupled to said gates of said first and second field effect transistors.

20. The circuit of claim 19 wherein said reverse blocking circuit of each subcircuit of said plurality of subcircuits further comprises a switch coupled between said amplifier and said gates of said first and second field effect transistors, said switch being capable of providing a current path to discharge said gates of said first and second field effect transistors.

21. An N-redundant circuit for distributing power from N power sources to a load, N being an integer greater than 1, said circuit comprising:

N subcircuits, wherein each subcircuit of said N subcircuits is adapted to be coupled to a corresponding power source and to said load, each subcircuit of said N subcircuits comprising:

a first field effect transistor having a gate, a channel and a body diode;

a second field effect transistor having a gate, a channel and a body diode, said channel of said first field effect transistor and said channel of said second field effect transistor being coupled in series between said corresponding power source and said output terminal, said body diode of said first field effect transistor being aligned with an opposite polarity to said body diode of said second field effect transistor;

a charge pump coupled to said gates of said first and second field effect transistors, said charge pump being capable of discharging said gates of said first and second field effect transistors;

an overcurrent shutdown circuit having an output lead coupled to said charge pump, a first input lead coupled to said corresponding input terminal and a second input lead coupled to said channel of said first field effect transistor, said overcurrent shutdown circuit being capable of causing said charge pump to discharge said gates of said first and second field effect transistors during an overcurrent condition is said first and second field effect transistors, said overcurrent shutdown circuit being capable of limiting an mount of current conducted by said first and second field effect transistors during periods of high current demand by said load; and a reverse blocking circuit having an output lead coupled to said charge pump, a first input lead coupled to said corresponding input terminal and a second input lead coupled to said output terminal, said reverse blocking circuit being capable of discharging said gates of said first and second field effect transistors, wherein said circuit is capable of isolating both power source and load faults.

22. The circuit recited in claim 21 wherein said circuit is capable of automatically providing power from a functioning power source of said N power sources when one up to N−1 power sources of said N power sources fails.

23. A circuit for distributing power from a power source to a load, said circuit comprising:

an input terminal;

an output terminal;

a first field effect transistor having a gate, a channel and a body diode;

a second field effect transistor having a gate, a channel and a body diode, said channel of said first field effect transistor and said channel of said second field effect transistor being coupled in series between said input terminal and said output terminal, said body diode of said first field effect transistor being aligned with an opposite polarity to said body diode of said second field effect transistor;

means, coupled to said channel of said first field effect transistor, for detecting an overcurrent condition in said first field effect transistor and for detecting a current flowing from said output terminal to said input terminal; and means, coupled to said sensor and said gates of said first and second field effect transistors, for discharging said gates of said first and second field effect transistors in response to a control signal outputted by said sensor.

* * * * *

UNITED STATES PATENT AND TRADEMARK OFFICE
CERTIFICATE OF CORRECTION

Page 1 of 4

PATENT NO. : 5,654,859
DATED : August 5, 1997
INVENTOR(S) : F. Shi

It is certified that error appears in the above-identified patent and that said Letters Patent is hereby corrected as shown below:

Title Page:

[56] Refs. Cited (US Pats.) Please insert the following:

--2,840,725   06/1958   R.E. King, Jr. et al.   307/87
3,949,238   04/1976   Brookes   307/64
4,275,311   06/1981   Agazzone et al.   290/2
4,607,330   08/1986   McMurray et al.   364/200
4,633,431   12/1986   Bar   364/900
4,638,175   01/1987   Bradford et al.   307/64
4,659,942   04/1987   Volp   307/19
4,788,449   11/1988   Katz, deceased   307/64
4,877,972   10/1989   Sobhani et al.   307/48
4,896,254   01/1990   Bennett   363/50--

[56] Refs. Cited (Other Pubs.) Please insert the following:

Lazarovici, C., "Fault-Tolerant Power Systems," *Powertechnics Magazine* ___:39-42 (January 1989).

UNITED STATES PATENT AND TRADEMARK OFFICE
CERTIFICATE OF CORRECTION

PATENT NO. : 5,654,859
DATED : August 5, 1997
INVENTOR(S) : F. Shi

It is certified that error appears in the above-identified patent and that said Letters Patent is hereby corrected as shown below:

Faber, A. and B. Kennelly, *Application Notes AN/P-1* "Hybrid Solid-State Power Controller Outperforms Conventional Circuit Breakers," ILC Data Device Corporation (March 1991).

Datasheet, "SSP-21110 28 VDC Solid-State Power Controllers," ILC Data Device Corporation (1990).

Heath, F., "The Pitfalls of Industrial Power," *Electronic Engineering Times*, p. 50 (August 1992).

Montoya, L., "Need for Tolerance is Paramount," *Electronic Engineering Times*, p. 44 (August 1993).

McCambridge, P., "Transient Protection Hits the Road," *Electronic Engineering Times*, pp. 56-58 (August 1993).

Burns, J., J. Riel and T diBene, "An Intelligent, Fault Tolerant, High Power, Distributed Power System for Massively Parallel Processing Computers," *Proceedings of the Ninth Annual IEEE Applied Power Electronics Conference and Exposition* (February 13-17, 1994), pp. 795-800 (May 1994).

UNITED STATES PATENT AND TRADEMARK OFFICE
CERTIFICATE OF CORRECTION

PATENT NO. : 5,654,859
DATED : August 5, 1997
INVENTOR(S) : F. Shi

It is certified that error appears in the above-identified patent and that said Letters Patent is hereby corrected as shown below:

COLUMN     LINE

Hunter, P., "Fault Tolerant, Hot-Pluggable Power System Design," *Proceedings of the Ninth Annual IEEE Applied Power Electronics Conference and Exposition* (February 13-17, 1994), pp. 815-822 (May 1994).

Needham, B., Eckerling, P., K. Siri, "Simulation of Large Distributed DC Power Systems Using Averaged Modeling Techniques and the Saber Simulator," *Proceedings of the Ninth Annual IEEE Applied Power Electronics Conference and Exposition* (February 13-17, 1994), pp. 801-807 (May 1994).

Rostek, P., "Power System Design for Massive Parallel Computer Systems," *Proceedings of the Ninth Annual IEEE Applied Power Electronics Conference and Exposition* (February 13-17, 1994), pp. 808-814 (May 1994).--

UNITED STATES PATENT AND TRADEMARK OFFICE
CERTIFICATE OF CORRECTION

PATENT NO. : 5,654,859
DATED : August 5, 1997
INVENTOR(S) : F. Shi

It is certified that error appears in the above-identified patent and that said Letters Patent is hereby corrected as shown below:

COLUMN    LINE

16    45    "an mount" should read --an amount--
(Claim 21,  line 32)

Signed and Sealed this

Seventeenth Day of February, 1998

Attest:

BRUCE LEHMAN

*Attesting Officer*    *Commissioner of Patents and Trademarks*